United States Patent
Wang et al.

(10) Patent No.: US 11,316,556 B2
(45) Date of Patent: Apr. 26, 2022

(54) SIGNAL TRANSMITTING CIRCUIT AND SIGNAL RECEIVING CIRCUIT FOR SERIAL COMMUNICATION, AND ELECTRONIC DEVICE

(71) Applicant: Shanghai GeoMicro Devices CO., LTD, Shanghai (CN)

(72) Inventors: YiXin Wang, Shanghai (CN); Hengsheng Liu, Shanghai (CN); Kang Chen, Shanghai (CN)

(73) Assignee: SHANGHAI GEOMICRO DEVICES CO., LTD, Shanghai (CN)

( * ) Notice: Subject to any disclaimer, the term of this patent is extended or adjusted under 35 U.S.C. 154(b) by 0 days.

(21) Appl. No.: 17/209,274

(22) Filed: Mar. 23, 2021

(65) Prior Publication Data
US 2021/0306027 A1 Sep. 30, 2021

(30) Foreign Application Priority Data
Mar. 24, 2020 (CN) .......................... 202010215814.2

(51) Int. Cl.
*H04B 3/30* (2006.01)
*H04B 1/04* (2006.01)
*H04B 1/16* (2006.01)

(52) U.S. Cl.
CPC .............. *H04B 3/30* (2013.01); *H04B 1/04* (2013.01); *H04B 1/16* (2013.01)

(58) Field of Classification Search
CPC ............... H04B 3/30; H04B 1/04; H04B 1/16
See application file for complete search history.

(56) References Cited

U.S. PATENT DOCUMENTS

| | | | | |
|---|---|---|---|---|
| 7,613,853 | B2* | 11/2009 | Chauhan | H04L 25/45 326/82 |
| 9,408,252 | B2* | 8/2016 | Chen | H04B 1/005 |
| 2007/0206428 | A1* | 9/2007 | Bae | G11C 11/4093 365/193 |
| 2014/0315598 | A1* | 10/2014 | Chen | H04B 1/40 455/553.1 |
| 2020/0194844 | A1* | 6/2020 | Xu | H01M 10/425 |
| 2020/0256979 | A1* | 8/2020 | Savchenkov | G01S 13/46 |

FOREIGN PATENT DOCUMENTS

CN 107770102 A 3/2018

* cited by examiner

*Primary Examiner* — Jean B Corrielus
(74) *Attorney, Agent, or Firm* — Bayramoglu Law Offices LLC

(57) ABSTRACT

A signal transmitting circuit and a signal receiving circuit for serial communication, and an electronic device are provided. The signal transmitting circuit includes a control module, a first transmitter, a second transmitter, a first differential pin, and a second differential pin, wherein the control module is configured to control the first transmitter to output a first signal via the first differential pin, and control the second transmitter to output a second signal via the second differential pin to record target information with a target signal after differentiating between the first signal and the second signal; and wherein if the target information includes data information and instant information, the data information is recorded in the target signal with a third signal with a first frequency while recording the instant information with a fourth signal with a second frequency, the first frequency is different from the second frequency.

20 Claims, 9 Drawing Sheets

SIGNAL TRANSMITTING CIRCUIT AND SIGNAL RECEIVING CIRCUIT FOR SERIAL COMMUNICATION, AND ELECTRONIC DEVICE

CROSS REFERENCE TO THE RELATED APPLICATIONS

This application is based upon and claims priority to Chinese Patent Application No. 202010215814.2, filed on Mar. 24, 2020, the entire contents of which are incorporated herein by reference.

TECHNICAL FIELD

The present invention relates to the field of serial communication, in particular, to a signal transmitting circuit and a signal receiving circuit for serial communication, and an electronic device.

BACKGROUND

For electronic devices requiring communication, they can be regarded as two communication nodes in the system. In addition to data information, the information transmitted between communication nodes may also include other instant information (such as overvoltage information, undervoltage information, data error information, clock error information and other alarm information).

In order to transmit instant information, existing solutions generally require additional pins and communication lines. If the same pin and communication line are required for transmission, the transmission of data information should be interrupted first, and then the instant information is transmitted when interrupted, so that the data information has to be transmitted after the transmission of the instant information is completed. Therefore, this will cause a drop in data communication efficiency.

SUMMARY

The present invention provides a signal transmitting circuit and a signal receiving circuit for serial communication, and an electronic device, so as to solve the problem of drop in data communication efficiency.

According to an aspect of the present invention, a signal transmitting circuit for serial communication is provided, including a control module, a first transmitter, a second transmitter, a first differential pin, and a second differential pin, wherein both the first transmitter and the second transmitter are controlled by the control module; the first transmitter is connected to the first differential pin, and the first differential pin is configured to be externally connected a first communication line; the second transmitter is connected to the second differential pin, and the second differential pin is configured to be externally connected to a second communication line;

the control module is configured to:

control the first transmitter to output a first signal via the first differential pin, and control the second transmitter to output a second signal via the second differential pin, so as to record target information with a target signal after differentiating between the first signal and the second signal, wherein if the target information includes data information and preset instant information, the data information is recorded in the target signal with a signal with a first frequency while recording the instant information with a signal with a second frequency, the first frequency being different from the second frequency.

Optionally, the control module is specifically configured to:

control an output voltage of the first transmitter and/or the second transmitter to change between two different voltages to form a signal recording the instant information in the target signal if the instant information to be transmitted is generated; the change includes gradually changing or switching between two different voltages;

control the output voltage of the first transmitter or the second transmitter to be at a first voltage at a time to form a signal recording the data information in the target signal at any time when the data information is to be transmitted.

Optionally, the change further includes maintaining a preset duration after gradually changing or switching to a higher voltage of the two different voltages.

Optionally, the control module is specifically configured to implement, when controlling the output voltage of the first transmitter and/or the second transmitter to change between the two different voltages, at least one of:

controlling the output voltage of the first transmitter to change between a second voltage and a third voltage while controlling a voltage of the second transmitter to maintain at the second voltage;

controlling the output voltage of the first transmitter to change between the second voltage and the third voltage while controlling the voltage of the second transmitter to change between the second voltage and a fourth voltage;

controlling the output voltage of the first transmitter to change between the second voltage and the fourth voltage while controlling a voltage of the second transmitter to maintain at the second voltage;

controlling the voltage of the second transmitter to change between the second voltage and the third voltage while controlling the voltage of the first transmitter to maintain at the second voltage;

controlling the voltage of the second transmitter to change between the second voltage and the fourth voltage while controlling the voltage of the first transmitter to maintain at the second voltage;

controlling the output voltage of the second transmitter to change between the second voltage and the third voltage while controlling the output voltage of the first transmitter to change between the second voltage and the fourth voltage.

Optionally, both the first transmitter and the second transmitter include a first circuit, n second circuits and at least one circuit unit; each circuit unit includes n third circuits, and the first circuit is connected in series with a first resistor and a first switch; each of the second circuits is provided with a second switch, and the n second circuits are connected in parallel with each other; each of the third circuits is provided with a third switch, and the n third circuits are connected in parallel with each other; n is an integer greater than or equal to 1, and the first switch, the second switch, and the third switch are all controlled by the control module;

one terminal of the first circuit is connected to a first voltage source, one terminal after the n second circuits are connected in parallel is connected to a second voltage source, and one terminal after the n third circuits of the circuit unit are connected in parallel is connected to a third voltage source directly or indirectly; the other terminal after the n second circuits are connected in parallel, the other terminal after the n third circuits are connected in parallel, and the other end of the first circuit are all connected to corresponding differential pins directly or indirectly;

all of the third switches are open when the n second switches of any transmitter are closed, and the output voltage of the transmitter is a voltage of the second voltage source when the first switch is open;

the n second switches are open when the n third switches of any current circuit unit of any transmitter are closed, and the output voltage of the transmitter is a voltage of the third voltage source connected to the current circuit unit when the first switch is open;

the n third switches are open when the n second switches of any transmitter are open, and the output voltage of the transmitter is a voltage of the first voltage source when the first switch is closed;

wherein the voltage of the first voltage source is lower than the voltages of the second voltage source and the third voltage source, or the voltage of the first voltage source is higher than the voltages of the second voltage source and the third voltage source.

Optionally, each of the second circuits is also provided with a second resistor connected in series with the second switch, and each of the third circuits is provided with a third resistor connected in series with the third switch, or:

each of the third circuits in each circuit unit is connected in parallel with one of the second circuits and then connected to a common resistor, and is connected to the differential pin via the corresponding common resistor.

Optionally, the control module, when controlling the output voltage of the corresponding transmitter to gradually change between the two different voltages, is specifically configured to control the n second switches in the corresponding transmitter to open one by one when all of the n third switches of the corresponding transmitter are closed and all of the n second switches are open, and control one of the third switches in the current circuit unit that is opposite to the second switch to close while opening one of the second switches; and:

control the n third switches of all of the current circuit units in the corresponding transmitter to open one by one when all of the n second switches of the corresponding transmitter are closed and all of the n third switches are open, and control one of the second switches that is opposite to the third switch to close while opening one of the third switches;

wherein for any pair of the second switch and the third switch that are opposite to each other, resistances of the second resistor and the third resistor that are connected in series therewith are the same.

Optionally, if each of the second circuits is also provided with a second resistor connected in series with the second switch and each of the third circuits is provided with a third resistor connected in series with the third switch, for any pair of the second switch and the third switch that are opposite to each other, resistances of the second resistor and the third resistor that are connected in series therewith are the same.

Optionally, if the gradually changing is gradually changing linearly, a resistance of each second resistor is the same, and an interval time when the control module controls the n second switches or the n third switches to open one by one is the same;

if the gradually changing is gradually changing sinusoidally and a resistance of each second resistor is the same, an interval time when the control module controls the n second switches to open one by one or controls the n third switches to open one by one is different;

if the gradually changing is gradually changing sinusoidally, an interval time when the control module controls the n second switches to open one by one or controls the n third switches to open one by one is the same, and a resistance of each second resistor is different.

Optionally, the voltage of the first voltage source in the first transmitter and the voltage of the first voltage source in the second transmitter are the same first voltage, and the voltage of the second voltage source in the first transmitter and the voltage of the second voltage source in the second transmitter are the same second voltage.

Optionally, the third voltage source in the first transmitter includes the third voltage source of the third voltage, and/or the third voltage source of the fourth voltage;

the third voltage source in the second transmitter includes the third voltage source of the third voltage, and/or the third voltage source of the fourth voltage.

Optionally, if both the first transmitter and the second transmitter include the third voltage source of the third voltage and the third voltage source of the fourth voltage, the circuit unit is the target circuit unit and the n third circuit lines of the circuit unit may alternatively be connected to the third voltage source of the third voltage or the third voltage source of the fourth voltage under the control of the control module when the number of the circuit units is one;

the n third circuits of one of the circuit units are connected to the third voltage source of the third voltage and the n third circuits of the other of the circuit units are connected to the third voltage source of the fourth voltage when the number of the circuit units is two.

Optionally, a waveform of the signal with the second frequency in the target signal is any one of a triangular wave, a sine wave, and a trapezoidal wave;

the waveform of the signal with the first frequency in the target signal is a rectangular wave.

Optionally, the first frequency is higher than the second frequency.

Optionally, the instant information includes at least one of:

a reset command, an enable command, a start command, alarm information;

wherein the alarm information includes at least one of overvoltage information, undervoltage information, data error information, and clock error information.

According to a second aspect of the present invention, an electronic device is provided, including the signal transmitting circuit for serial communication of the first aspect and other optional solutions.

Optionally, the electronic device further includes a signal receiving circuit for serial communication, the signal receiving circuit including a differential processing module and a signal acquisition module;

the differential processing module is connected to the first differential pin, the second differential pin and the signal acquisition module respectively; the differential processing module is configured to:

differentiate the first signal and the second signal from other electronic devices transmitted from the first communication line and the second communication line to obtain target signals of other electronic devices, and transmit the target signals of other electronic devices to the signal acquisition module;

the signal acquisition module is configured to:

obtain a signal with the first frequency recording the data information of other electronic devices from the target signals of other electronic devices;

obtain a signal with the second frequency recording the instant information of other electronic devices from the target signals of other electronic devices.

Optionally, the signal acquisition module includes a low-pass filter and a high-pass filter; both the low-pass filter and the high-pass filter are connected to the differential processing module;

if the first frequency is higher than the second frequency, the high-pass filter is configured to filter the target signals of other electronic devices to obtain the signal with the first frequency recording the data information of other electronic devices, and the low-pass filter is configured to filter the target signals of other electronic devices to obtain the signal with the second frequency recording the instant information of other electronic devices;

if the second frequency is higher than the first frequency, the low-pass filter is configured to filter the target signals of other electronic devices to obtain the signal with the first frequency recording the data information of other electronic devices, and the high-pass filter is configured to filter the target signals of other electronic devices to obtain the signal with the second frequency recording the instant information of other electronic devices.

According to a third aspect of the present invention, a signal receiving circuit for serial communication is provided, configured to receive the first signal and the second signal transmitted by the signal transmitting circuit for serial communication of the first aspect and other optional solutions.

the signal receiving circuit comprises a third differential pin, a fourth differential pin, the differential processing module, and the signal acquisition module; the third differential pin is configured to be externally connected to the first communication line, and the fourth differential pin is configured to be externally connected to the second communication line; the differential processing module is connected to the third differential pin, the fourth differential pin and the signal acquisition module respectively;

the differential processing module is configured to:

differentiate the first signal and the second signal transmitted from the first communication line and the second communication line to obtain the target signals, and transmit the target signals to the signal acquisition module;

the signal acquisition module is configured to:

obtain a signal with the first frequency recording the data information from the target signals;

obtain a signal with the second frequency recording the instant information from the target signals.

Optionally, the signal acquisition module includes a low-pass filter and a high-pass filter; both the low-pass filter and the high-pass filter are connected to the differential processing module;

if the first frequency is higher than the second frequency, the high-pass filter is configured to filter the target signals to obtain the signal with the first frequency recording the data information, and the low-pass filter is configured to filter the target signals to obtain the signal with the second frequency recording the instant information;

if the second frequency is higher than the first frequency, the low-pass filter is configured to filter the target signals to obtain the signal with the first frequency recording the data information, and the high-pass filter is configured to filter the target signals to obtain the signal with the second frequency recording the instant information.

According to a fourth aspect of the present invention, an electronic device is provided, including the signal receiving circuit for serial communication of the third aspect and other optional solutions.

According to a fifth aspect of the present invention, an electronic system is provided, including the electronic device provided by the second aspect, and the electronic device provided by the fourth aspect.

In the signal transmitting circuit and the signal receiving circuit for serial communication and the electronic device provided by the present invention, the same pair of differential pins are multiplexed to transmit data information and instant information, which may save pins and communication lines (if used in serial isolation communication, the isolation devices corresponding to the pins may further be saved) so as to be beneficial to save costs. At the same time, since the data information and the instant information in the present invention are transmitted at the same time, and may be distinguished based on frequency, there is no need to interrupt the transmission of data information in the present invention, so that higher transmission efficiency may be guaranteed, and interference and influence between signals of different information may be effectively avoided, thereby ensuring the accuracy of data transmission.

BRIEF DESCRIPTION OF THE DRAWINGS

To describe the technical solutions in the embodiments of the present invention or in the prior art more clearly, accompanying drawings required to describe the embodiments or the prior art are briefly described below. It is obvious that the accompanying drawings described below are only some embodiments of the present invention. It is apparent to those of ordinary skill in the art that other drawings may be further obtained based on the accompanying drawings without inventive effort.

DESCRIPTION OF REFERENCE NUMERALS

1—electronic device;
101—control module;

102—first transmitter;
103—second transmitter;
104—first differential pin;
105—second differential pin;
106—first isolation device;
107—second isolation device;
108—differential processing module;
109—signal acquisition module;
1091—low-pass filter;
1092—high-pass filter;
2—electronic device;
201—control module;
202—third transmitter;
203—fourth transmitter;
204—third differential pin;
205—fourth differential pin;
206—third isolation device;
207—fourth isolation device;
208—differential processing module;
209—signal acquisition module;
2091—low-pass filter;
2092—high-pass filter.

DETAILED DESCRIPTION OF THE EMBODIMENTS

The technical solutions in the embodiments of the present invention will be clearly and completely described hereafter in combination with the drawings in the embodiments of the present invention. It is apparent that the described embodiments are only a part of the embodiments of the present invention, but not the whole. Based on the embodiments of the present invention, all the other embodiments obtained by those of ordinary skill in the art without inventive effort are within the scope of the present invention.

Terms "first", "second", "third", "fourth", and the like (if any) in the specification and claims of the present invention and the foregoing accompanying drawings are used to distinguish similar objects, but do not need to be used for describing a specific sequence or an order. It should be understood that data used in this way can be interchanged under appropriate circumstances, so that the embodiments of the present invention described herein can be implemented in an order other than those illustrated or described herein. In addition, terms "including", "having", and any variations thereof are intended to cover non-exclusive inclusions, for example, processes, methods, systems, products, or devices that contain a series of steps or units need not be limited to those clearly listed steps or units, but may include other steps or units not explicitly listed or inherent to these processes, methods, products, or devices.

The technical solutions of the present invention are described in detail below with reference to the specific embodiments. The following several embodiments may be combined with each other, and a same or similar concept or process may not be described again in some embodiments.

Figure 1:
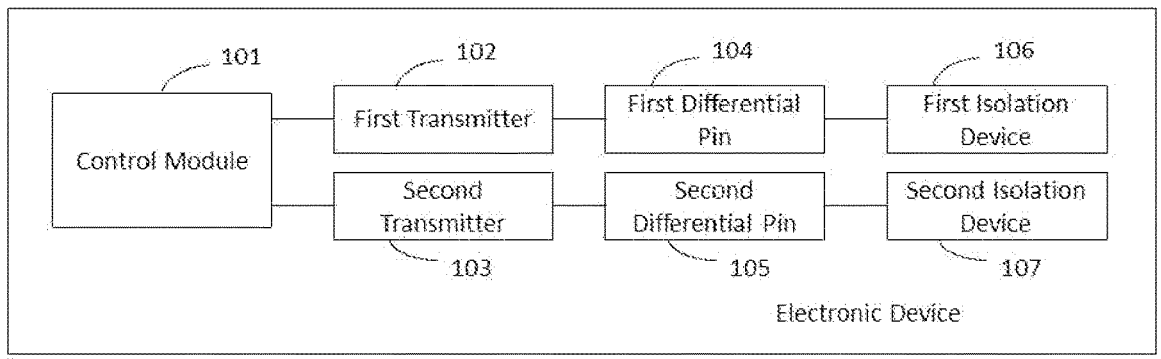
FIG. 1 is a structural schematic diagram 1 of an electronic device in an embodiment of the present invention.
Figure 2:
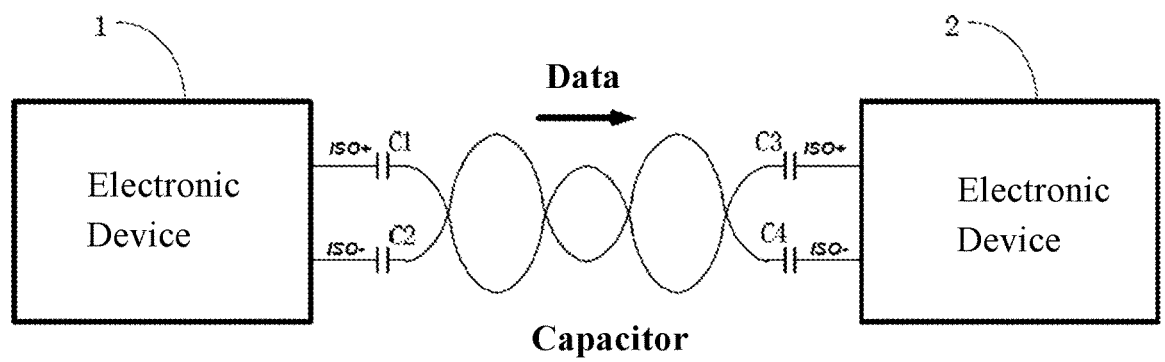
FIG. 2 is a schematic diagram 1 of a connection between electronic devices in an embodiment of the present invention.

FIG. 1 is a structural schematic diagram 1 of an electronic device in an embodiment of the present invention; FIG. 2 is a schematic diagram 1 of a connection between electronic devices in an embodiment of the present invention.

The electronic device 1 may have a signal transmitting circuit for serial communication, wherein the serial communication may be a serial isolation communication configured with isolation devices, or may be not configured with isolation devices. It can be seen that the signal transmitting circuit may be a part of the electronic device 1 as shown in FIG. 1. No matter what kind of electronic device the circuit is applied to, as long as the signal transmitting circuit described in the present embodiment is adopted, it will not deviate from the description of the present embodiment. In addition, the present embodiment does not exclude a solution in which the signal transmitting circuit or part of the circuit is independent of the electronic device. For example, the signal transmitting circuit may be a structure that may be separated from the electronic device.

With reference to FIG. 1, the signal transmitting circuit for serial communication may include a control module 101, a first transmitter 102, a second transmitter 103, a first differential pin 104, and a second differential pin 105, while including a first isolation device 106 and a second isolation device 107 when applied to a serial isolation communication as shown in FIG. 1.

The first transmitter 102 and the second transmitter 103 are both controlled by the control module 101, further transmitting required signals under the control of the control module 101. The first transmitter 102 is connected to the first differential pin 104, and the first differential pin 104 is configured to be externally connected a first communication line; the second transmitter 103 is connected to the second differential pin 105, and the second differential pin 105 is configured to be externally connected to a second communication line. In actual implementation, when applied to the serial isolation communication, i.e., the serial communication being the serial isolation communication, the first differential pin 104 may be connected to a first communication line through a first isolation device 106, and the second differential pin 105 may be connected to a second communication line through a second isolation device 107.

The first differential pin and the second differential pin may be understood as any pin that the transmitted signal may be used for differential (or differential operation). The first differential pin 104 shown in FIG. 1 may also be characterized as an ISO+ pin shown in FIG. 2, and the second differential pin 105 shown in FIG. 1 may also be characterized as an ISO-pin shown in FIG. 2.

Correspondingly, the communication line connected to the differential pin may be characterized as a differential communication line. In a specific example, it can be used to transmit a high-frequency signal, which may be transmitted to the other end that is electrically isolated.

The isolation device may be any device that can achieve electrical isolation, and matching isolation devices may be selected adaptively according to different isolation methods. Taking FIG. 2 as an example, for the electronic device 1, if a capacitor is used to achieve isolation, the isolation device may use an isolation capacitor, which may be, for example, an isolation capacitor C1 connected to the ISO+ pin of the electronic device 1 shown in FIG. 2 or an isolation capacitor C2 connected to the ISO– pin of the electronic device 1 shown in FIG. 2. Correspondingly, in the electronic device 2 communicating with the electronic device 1, the ISO+ pin may further be isolated by an isolation capacitor C3, and the ISO– pin may further be isolated by an isolation capacitor C4. In other examples, in addition to the above capacitor isolation, electromagnetic isolation, photoelectric isolation (optical coupling) and other isolation methods may further be used.

In the present embodiment, the control module 101 is configured to:

control the first transmitter 102 to output a first signal via the first differential pin 104, and control the second transmitter 103 to output a second signal via the second differential pin 105, so as to record target information with a target signal after differentiating between the first signal and the second signal.

If the target information includes data information and instant information, the data information is recorded in the target signal with a signal with a first frequency while recording the instant information with a signal with a second frequency, the first frequency being different from the second frequency.

The data information may be understood as the data itself that has to be transmitted from one electronic device to another electronic device to be stored or cached by the interaction between electronic devices.

Correspondingly, the instant information may be understood as information that is generated instantly in response to the occurrence of a specific event during the interaction between electronic devices.

In one example, if an event that requires an alarm occurs, the corresponding instant information may be, for example, alarm information, which may be, for example, overvoltage information, undervoltage information, data error information, clock error information, etc., which may be used to characterize the overvoltage, undervoltage, data error, clock error, etc. of the chip in the electronic device (specifically, the electronic device that transmits the instant information).

In another example, the instant information may also include, for example, a reset command, an enable command, a start command, etc., which are respectively used to reset, enable, and start the chip, circuit, or device in the electronic device (specifically, the electronic device that receives the instant information). These commands may be generated by electronic devices (specifically, electronic devices that transmit the instant information) in response to human manipulation or external input, or may further be automatically generated due to the fulfillment of certain conditions (for example, the arrival of the preset time, the sensor detects the preset information, etc.). A the same time, receiving the manipulation, receiving external input, and fulfilling certain conditions may be regarded as a manipulation event, external input event, and condition fulfillment event. Therefore, these commands may be understood as the instant information involved in the present embodiment. And, the commands that may be used as the instant information are not limited to the above list.

It can be known from the functions of the hardware and control modules involved in the above solution:

in the present embodiment, the same pair of differential pins are multiplexed to transmit data information and instant information, and further, pins and isolation devices corresponding to the pins may be saved, which is beneficial to saving costs.

At the same time, since the data information and the instant information in the present embodiment are transmitted at the same time, and may be distinguished based on frequency, there is no need to interrupt the transmission of data information in the present embodiment and optional solutions, so that higher transmission efficiency may be guaranteed, and interference and influence between signals of different information may be effectively avoided, thereby ensuring the accuracy of data transmission.

The first signal and the second signal actually refer to the first signal and the second signal mentioned above that may be formed by further controlling the output voltage after the output voltage of the transmitter changes over time. The following will focus on how to control the output voltage.

Figure 3:
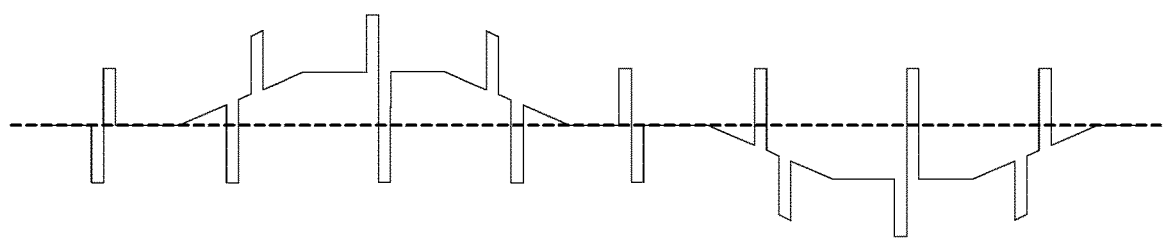
FIG. 3 is a partial waveform diagram 1 of a target signal in an embodiment of the present invention.
Figure 4A:
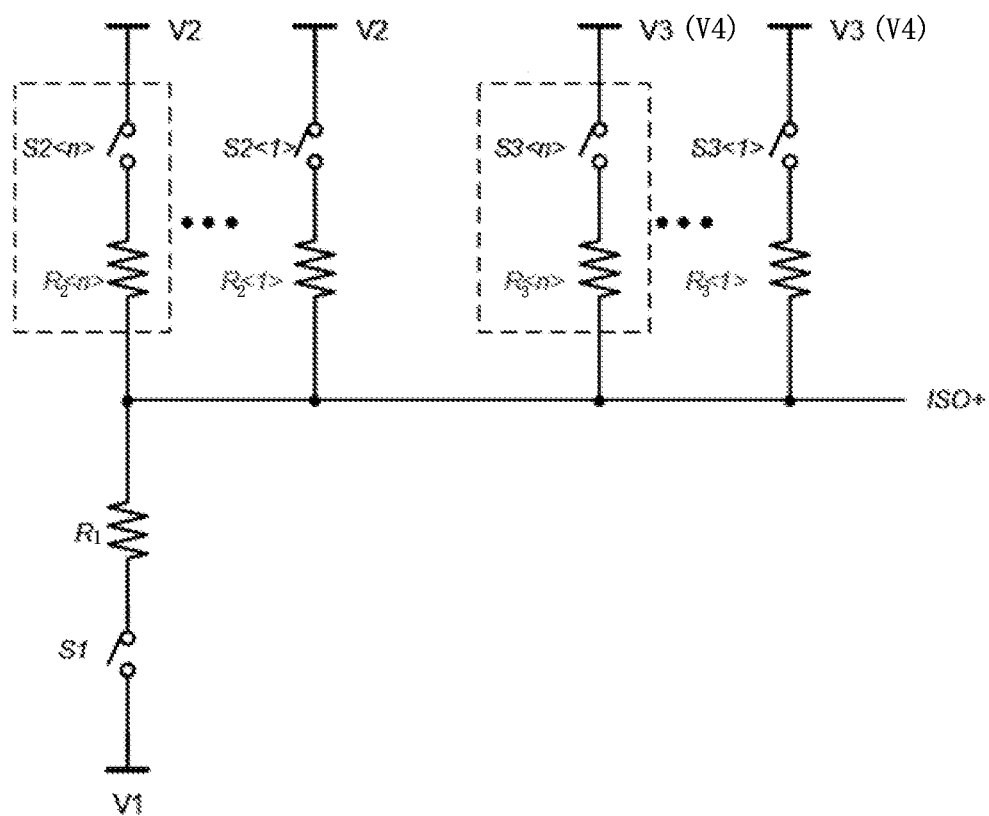
FIG. 4A is a circuit diagram 1 of a transmitter in an embodiment of the present invention.
Figure 4B:
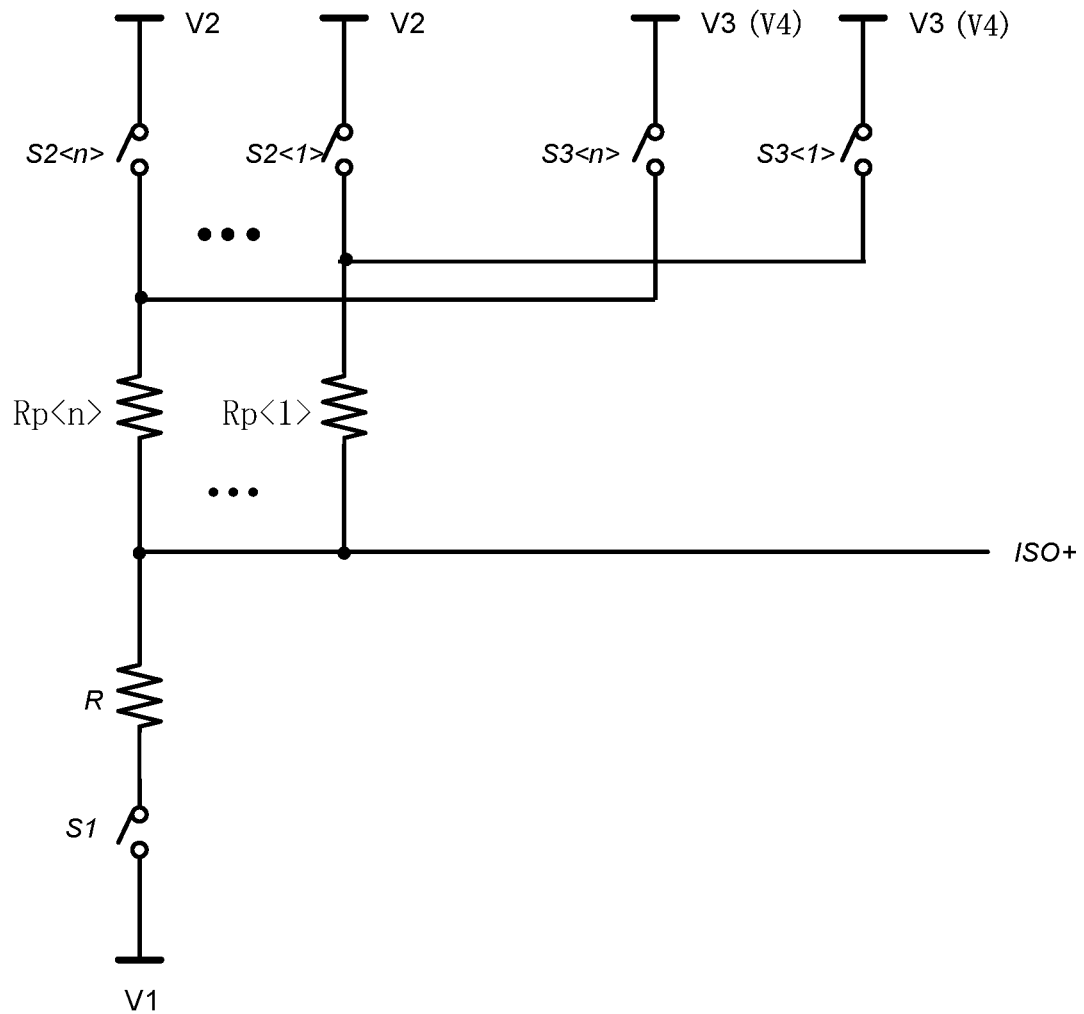
FIG. 4B is a circuit diagram 2 of a transmitter in an embodiment of the present invention.
Figure 4C:
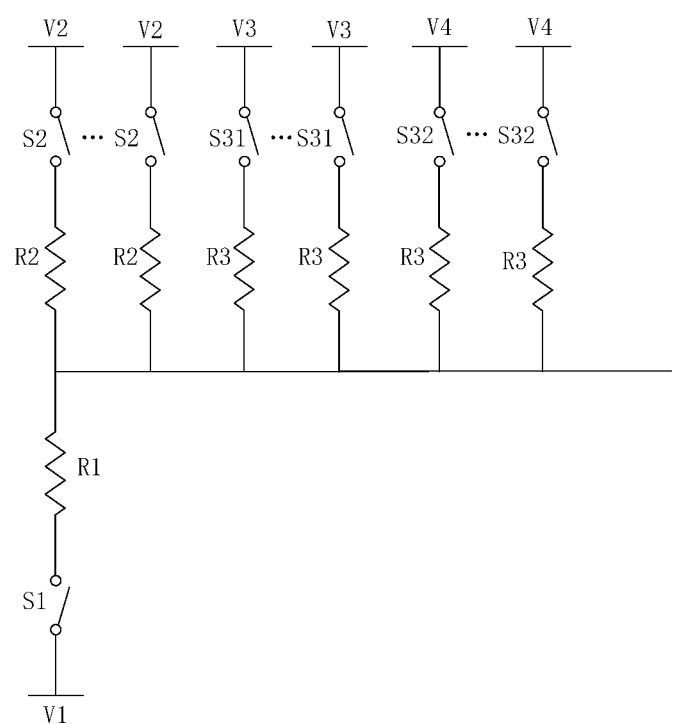
FIG. 4C is a circuit diagram 3 of a transmitter in an embodiment of the present invention.
Figure 4D:
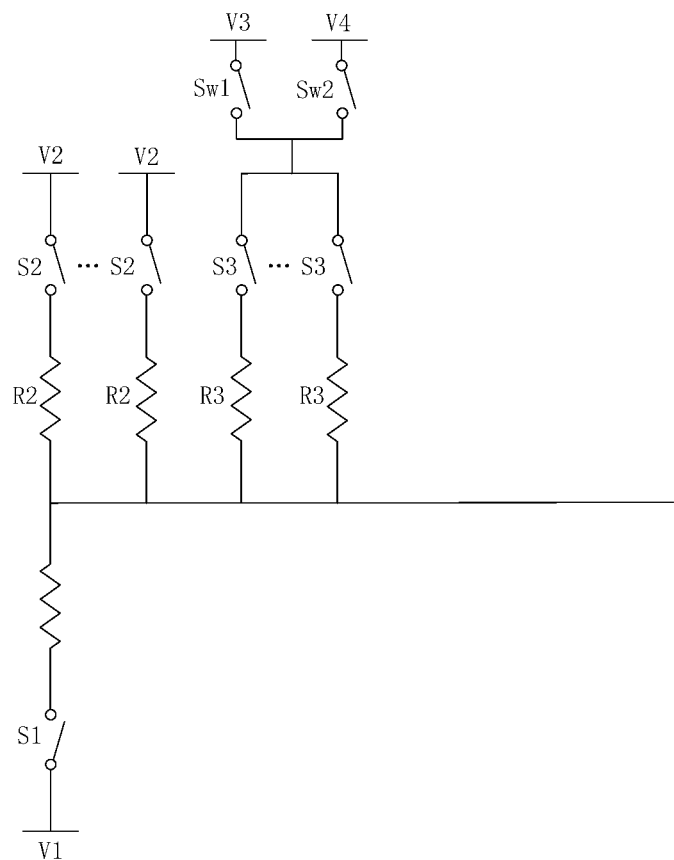
FIG. 4D is a circuit diagram 4 of a transmitter in an embodiment of the present invention.
Figure 5:
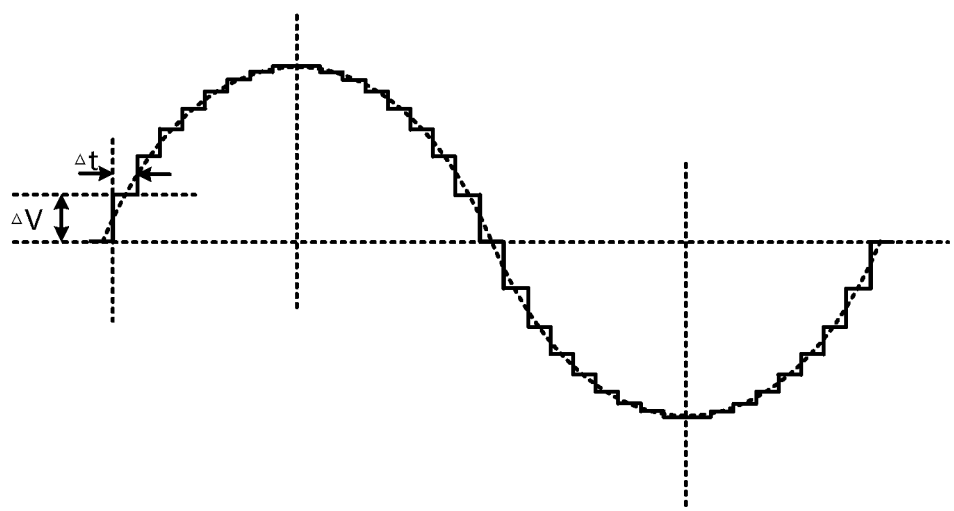
FIG. 5 is a schematic diagram of the principle of forming a gradual change in sinusoidal change in an embodiment of the present invention.
Figure 6:
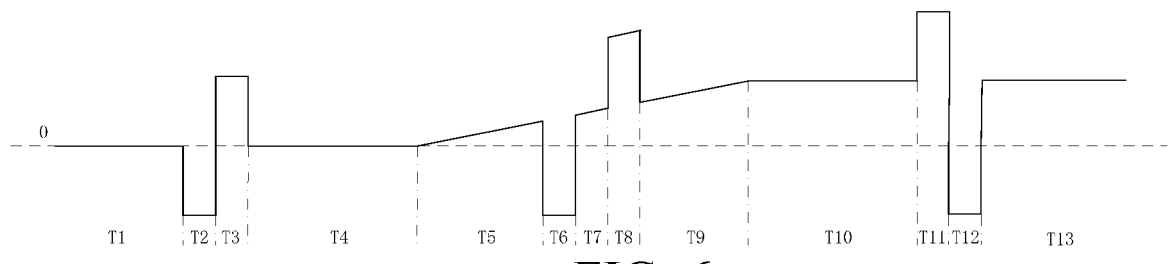
FIG. 6 is a partial waveform diagram 2 of a target signal in an embodiment of the present invention.

FIG. 3 is a partial waveform diagram 1 of a target signal in an embodiment of the present invention; FIG. 4A is a circuit diagram 1 of a transmitter in an embodiment of the present invention; FIG. 4B is a circuit diagram 2 of a transmitter in an embodiment of the present invention; FIG. 4C is a circuit diagram 3 of a transmitter in an embodiment of the present invention; FIG. 4D is a circuit diagram 4 of a transmitter in an embodiment of the present invention; FIG. 5 is a schematic diagram of the principle of forming a gradual change in sinusoidal change in an embodiment of the present invention; FIG. 6 is a partial waveform diagram 2 of a target signal in an embodiment of the present invention.

In an embodiment, the control module 101 is specifically configured to:

control an output voltage of the first transmitter and/or the second transmitter to change between two different voltages to form a signal recording the instant information in the target signal if the instant information to be transmitted is generated.

The change includes gradually changing or switching between two different voltages; further, for example, the change further includes maintaining a preset duration after gradually changing or switching to a higher voltage of the two different voltages. Whether it is maintained or not, it belongs to the range of "changing between two different voltages" described above.

In an embodiment, the control module 101 is further specifically configured to:

control the output voltage of the first transmitter or the second transmitter to be at a first voltage at a time to form a signal recording the data information in the target signal at any time when the data information is to be transmitted.

It can be seen that the signal with the first frequency that records the data information usually does not include the process of gradually changing the voltage, and the signal with the second frequency that records the instant information usually includes the process of gradually changing the voltage On this basis, with reference to FIG. 3, the signal with the first frequency (i.e., the signal that records the data information) may be, for example, the rectangular wave shown in FIG. 3, and the signal with the second frequency (i.e., the signal that records the instant information) may be, for example, the trapezoidal wave shown in FIG. 3.

In the solution shown in FIG. 3, the first frequency mentioned above is higher than the second frequency, which may be understood as a better choice for frequency.

And, it can also be seen from the example in FIG. 3 that the controlling the output voltage to remain at the first voltage may occur at any time, i.e., it may occur when the output voltage of the transmitter or another transmitter changes between two different voltages, or when the voltage does not change.

In one example, the waveform of the signal with the second frequency in the target signal may be a trapezoidal wave as shown in FIG. 3. In another example, the waveform of the signal with the second frequency may further be a square wave, a triangle wave, a sine wave, a waveform similar to a square wave, a triangle wave, a sine wave, a trapezoidal wave, or an arbitrary waveform that is not clearly defined. As long as there is a gradual change in the waveform and its frequency is different from the first frequency, it does not deviate from the description of the above embodiment.

In one example, the waveform of the signal with the first frequency in the target signal is a rectangular wave; the actual waveform may be a standard rectangular waveform or a rectangular waveform, as long as it is formed by directly pulling the output voltage of the transmitter to the first voltage, instead of being controlled to gradually change to the first voltage; regardless of whether it is formed because the output voltage of the first transmitter is pulled to the first voltage or is formed because the output voltage of the second transmitter is pulled to the first voltage, it does not deviate from the description of the above embodiment.

In actual implementation, with references to FIG. 4A and FIG. 4B, both the first transmitter and the second transmitter include a first circuit, n second circuits and at least one circuit unit; each circuit unit includes n third circuits, and the first circuit is connected in series with a first resistor R1 and a first switch S1; each of the second circuits is provided with a second switch S2, and the n second circuits are connected in parallel with each other; each of the third circuits is connected in series with a third resistor R3 and a third switch S3, and the n third circuits are connected in parallel with each other; n is an integer greater than or equal to 1, and the first switch S1, the second switch S2, and the third switch S3 are all controlled by the control module.

One terminal of the first circuit is connected to a first voltage source, one terminal after the n second circuits are connected in parallel is connected to a second voltage source, and one terminal after the n third circuits of the circuit unit are connected in parallel is connected to a third voltage source; the other terminal after the n second circuits are connected in parallel, the other terminal after the n third circuits are connected in parallel, and the other end of the first circuit are all connected to corresponding differential pins;

the n third switches S3 are open when the n second switches S2 of any transmitter are closed, and the output voltage of the transmitter is a voltage of the second voltage source when the first switch S1 is open;

the n second switches S2 are open when the n third switches S3 of any current circuit unit of any transmitter are closed (at this time, if the number of circuit units is at least two, the third switches S3 of other circuit units are open), and the output voltage of the transmitter is a voltage of the third voltage source connected to the current circuit unit when the first switch S1 is open;

the n third switches S3 are open when the n second switches S2 of any transmitter are open, and the output voltage of the transmitter is a voltage of the first voltage source when the first switch S1 is closed.

The voltage of the first voltage source is lower than the voltages of the second voltage source and the third voltage source, or the voltage of the first voltage source is higher than the voltages of the second voltage source and the third voltage source.

The current circuit unit may be understood as the circuit unit that currently needs to participate in the voltage change, which, for example, may be a circuit unit of the third voltage source connected to the third voltage or may be a circuit unit of the third voltage source connected the fourth voltage. If the number of circuit units is at least two, the circuit units other than the current circuit unit may remain open.

The voltage source may be any circuit configuration that may provide a stable voltage. In one example, each voltage source may, for example, include a capacitor; by connecting the capacitor between the node of the corresponding potential and the ground, the voltage across the capacitor may be maintained at a certain voltage; further, connecting the capacitor to the circuit shown in FIG. 4A to FIG. 4D may be used as a voltage source to provide the required voltage. In another example, if the voltage provided by a certain voltage source is 0 volts, the voltage source may also be understood as ground, and further, connecting the voltage source may be understood as grounding.

In addition, the voltage of each voltage source is usually fixed, and the present embodiment does not exclude the possibility that the voltage of the voltage source may be adjusted and changed.

In actual implementation, a resistance of each of the third resistors is the same as a resistance of one of the second resistors;

the control module 101, when controlling the output voltage of the corresponding transmitter to gradually change between the two different voltages, is specifically configured to control the n second switches in the corresponding transmitter to open one by one when the n third switches of the corresponding transmitter are closed and all of the n second switches are open, and control one of the third switches in the current circuit unit that is opposite to the second switch to close while opening one of the second switches; and:

control the n third switches of all of the current circuit units in the corresponding transmitter to open one by one when all of the n second switches of the corresponding transmitter are closed and all of the n third switches are open, and control one of the opposite second switches to close while opening one of the third switches;

wherein for any pair of the second switch and the third switch that are opposite to each other, resistances of the second resistor and the third resistor that are connected in series therewith are the same.

Taking FIGS. 4A-4D as an example, when the n second switches S2 of a certain transmitter are all closed and the n third switches are all open, the output voltage is the voltage of the second voltage source if the first switch is not closed, and each time a second switch is opened and a third switch is closed, the output voltage will change accordingly.

In one example, if the gradually changing is gradually changing linearly, a resistance of each second resistor is the same, and an interval time when the control module controls the n second switches or the n third switches to open one by one is the same.

In the example, the voltage of the second voltage source of a certain transmitter (assuming it is the transmitter corresponding to an ISO+ pin) is the second voltage V2, the voltage of the third voltage source is the third voltage V3, and a resistance of each second resistor and the third resistor is R, then:

when the n second switches S2 are all closed, the n third switches S3 are all open, and the first switch S1 is open:

$$V(ISO+) = V2;$$

when the n second switches S2 are all open, the n third switches S3 are all closed, and the first switch S1 is open:

$$V(ISO+) = V3;$$

when one of the second switches S2 of the n second switches S2 is open while the remaining second switches S2 remaining closed, one of the third switches S3 is closed while the remaining third switches S3 remaining open, and the first switch S1 is open:

$$V(ISO+) = (V3-V2) \cdot \frac{\frac{R}{n-1}}{\frac{R}{n-1}+R} + V2 = (V3-V2) \cdot \frac{1}{n} + V2;$$

when two of the second switches S2 of the n second switches S2 are open while the remaining second switches S2 remaining closed, two of the third switches S3 are closed while the remaining third switches S3 remaining open, and the first switch S1 is open:

$$V(ISO+) = (V3 - V2) \cdot \frac{\frac{R}{n-2}}{\frac{R}{n-2} + \frac{R}{2}} + V2 = (V3 - V2) \cdot \frac{2}{n} + V2;$$

and so on; it can be seen that each time a second switch and a third switch are switched, the amount of change in the output voltage is:

$$(V3 - V2) \cdot \frac{1}{n}.$$

It can be seen that the amount of change for each switching is the same, and furthermore, gradually linear changing may be generated.

In another example, if the gradually changing is gradually changing sinusoidally and a resistance (e.g., R) of each second resistor is the same, an interval time when the control module controls the n second switches to open one by one or controls the n third switches to open one by one may be different;

In another example, if the gradually changing is gradually changing sinusoidally and an interval time when the control module controls the n second switches to open one by one or controls the n third switches to open one by one is the same, a resistance of each second resistor may be different. Therefore, the resistance of each of the third resistors is the same as the resistance of one of the second resistors; thus, the resistance of each of the third resistors may also be different.

With reference to FIG. 5, assuming that n=8 above and the resistance of each second resistor is different, each step in FIG. 5 corresponds to a switch of the switches (for example, opening a second switch while closing a third switch), wherein the Δt of each step is the same, i.e., the intervals involved above are the same; correspondingly, as long as the appropriate resistance is configured, different step heights (i.e., ΔV within the corresponding intervals) may be obtained, and a sine wave may be obtained. As the value of n increases, a smoother sine wave may be realized according to the principle of calculus.

In the above solution, the second resistor and the third resistor may be distinguished to form a circuit as shown in FIG. 4A, because the resistances of the second resistor and the third resistor are the same. In another solution, the corresponding second circuit and third circuit may also be configured to share the same common resistance; for example, in FIG. 4B, each third circuit in each circuit unit is connected in parallel with a second circuit and then connected to a common resistor Rp, and is connected to the differential pin via the corresponding common resistor Rp, wherein if the number of circuit units is multiple, the second circuit may be connected in parallel with the third circuit of the multiple circuit units at the same time. At the same time, the control method for the second switch and the third switch in the circuit shown in FIG. 4B is similar to that for the circuit shown in FIG. 4A.

In examples shown in FIGS. 3 to 6, the voltage of the first voltage source in the first transmitter and the voltage of the first voltage source in the second transmitter are the same first voltage V1, and the voltage of the second voltage source in the first transmitter and the voltage of the second voltage source in the second transmitter are the same second voltage V2; in the first transmitter and in the second transmitter, the voltage of the second voltage source may be lower than the voltage of the third voltage source, or may be higher than the voltage of the third voltage source.

Taking FIG. 4A and FIG. 4B as an example, if there is only one third voltage source, for example, a third voltage source with only the third voltage V3 or a third voltage source with only the fourth voltage V4 in a transmitter, then:

in one example, the voltage of the third voltage source in the first transmitter and the voltage of the third voltage source in the second transmitter may be the same third voltage V3.

In another example, the voltage of the third voltage source in the first transmitter is the third voltage V3, and the voltage of the third voltage source in the second transmitter may be the fourth voltage V4; or, the voltage of the third voltage source in the second transmitter is the third voltage V3, and the voltage of the third voltage source in the first transmitter may be the fourth voltage V4; wherein the third voltage V3 and the fourth voltage V4 are different voltages.

Taking FIG. 4C and FIG. 4D as an example, if there is more than one third voltage source, for example, both the first transmitter and the second transmitter include the third voltage source of the third voltage V3 and the third voltage source of the fourth voltage V4, then:

when the number of the circuit units is two, for example, in FIG. 4C, the n third circuits of one circuit unit (e.g., the third circuit where the third switch S31 is located) are connected to the third voltage source of the third voltage V3, and the n third circuits of the other circuit unit (e.g., the third circuit where the third switch S32 is located) are connected to the third voltage source of the fourth voltage; furthermore, when the circuit unit where the third switch S31 is located has to be used, each third switch S32 may be kept open, and conversely, when the circuit unit where the third switch S32 is located is required, each third switch S31 may be kept open while controlling each third switch S31 to realize the process of gradually changing or switching and controlling each third switch S32 to realize the process of gradually changing or switching, so as to meet the relevant description of the third switch S3 above.

For example, in FIG. 4C, the circuit unit is the target circuit unit and the n third circuit lines of the circuit unit may alternatively be connected to the third voltage source of the third voltage V3 or the third voltage source of the fourth voltage V4 under the control of the control module when the number of the circuit units is one; specifically, a switching switch Sw1 may be provided between the circuit unit and the third voltage source of the third voltage V3, and a switching switch Sw2 may be provided between the circuit unit and the third voltage source of the fourth voltage V4, so that the corresponding voltage source may be connected by controlling the on and off of the two switches.

The above circuit structure examples are all to cooperate with the control module to realize the change of output voltage; when the number of the second switch is one, the output voltage may be switched between two different voltages, and when the number of the second switch is more than one, the output voltage may be gradually changed between two different voltages.

In actual implementation, the control module is specifically configured to implement, when controlling the output voltage of the first transmitter and/or the second transmitter to change between the two different voltages, at least one control method of:

controlling the output voltage of the first transmitter 102 to gradually change between the second voltage V2 and the third voltage V3 while controlling the voltage of the second transmitter 103 to maintain at the second voltage;

controlling the output voltage of the first transmitter 102 to change between the second voltage V2 and the third voltage V3 while controlling the voltage of the second transmitter 103 to change between the second voltage V2 and the fourth voltage V4; specifically, for example, when the output voltage of the first transmitter 102 changes from the second voltage V2 to the third voltage V3, the output voltage of the second transmitter 103 synchronously changes from the second voltage V2 to the fourth voltage V4, and when the output voltage of the first transmitter 102 changes back from the third voltage V3 to the second voltage V2, the output voltage of the second transmitter 103 synchronously changes from the fourth voltage V4 back to the second voltage V2;

controlling the output voltage of the second transmitter 103 to change between the second voltage V2 and the third voltage V3 while controlling the output voltage of the second transmitter 102 to maintain at the second voltage;

controlling the voltage of the second transmitter 103 to change between the second voltage V2 and the fourth voltage V4 while controlling the output voltage of the first transmitter 102 to maintain at the second voltage;

controlling the output voltage of the second transmitter 103 to change between the second voltage V2 and the third voltage V3 while controlling the output voltage of the first transmitter 102 to change between the second voltage V2 and the fourth voltage V4; specifically, for example, when the output voltage of the second transmitter 103 changes from the second voltage V2 to the third voltage V3, the output voltage of the first transmitter 102 synchronously changes from the second voltage V2 to the fourth voltage V4, and when the output voltage of the second transmitter 103 changes back from the third voltage V3 to the second voltage V2, the output voltage of the first transmitter 102 synchronously changes from the fourth voltage V4 back to the second voltage V2.

In addition, FIGS. 4A to 4D are various examples of circuit structures. As long as at least one of the above control methods may be realized, even if the circuit structure is different from that of FIGS. 4A to 4D, it does not deviate from the scope covered by the above description.

The following is a detailed description in conjunction with FIG. 6 (in this paragraph as an example, the gradually changing is achieve by the control method of: controlling the voltage of the first transmitter 102 to gradually change between the second voltage V2 and the third voltage V3 while controlling the voltage of the second transmitter 103 to maintain at the second voltage):

the first differential pin is an ISO+ pin, and the corresponding output voltage is represented by V(ISO+); the second differential pin is an ISO− pin, and the corresponding output voltage is represented by V(ISO−): the difference specifically refers to V(ISO+)−V(ISO−), which may represent the voltage at each time in the target signal shown in FIG. 6;

within the time $T1$:

$V(ISO+)=V2$, and $V(ISO-)=V2$, then, $V(ISO+)-V(ISO-)=0$;

within the time $T2$:

$V(ISO+)=V1, V(ISO-)=V2$, then, $V(ISO+)-V(ISO-)=V1-V2$;

within the time $T3$:

$V(ISO+)=V2, V(ISO-)=V1$, then, $V(ISO+)-V(ISO-)=V2-V1$;

within the time $T4$:

$V(ISO+)=V2$ and $V(ISO-)=V2$, then, $V(ISO+)-V(ISO-)=0$;

within the time $T5$:

$V(ISO+)=V2+\Delta V$, and $V(ISO-)=V2$, then $V(ISO+)-V(ISO-)=\Delta V$;

$\Delta V$ here refers to the changed voltage of the output voltage of the ISO+ pin during the gradual change from V2 to V3;

within the time $T6$:

$V(ISO+)=V1, V(ISO-)=V2$, then, $V(ISO+)-V(ISO-)=V1-V2$;

within the time $T7$:

$V(ISO+)=V2+\Delta V, V(ISO-)=V2$, then, $V(ISO+)-V(ISO-)=\Delta V$;

within the time $T8$:

$V(ISO+)=V2+\Delta V, V(ISO-)=V1$, then, $V(ISO+)-V(ISO-)=V2+\Delta V-V1$;

within the time $T9$:

$V(ISO+)=V2+\Delta V, V(ISO-)=V2$, then, $V(ISO+)-V(ISO-)=\Delta V$;

within the time $T10$:

$V(ISO+)=V3, V(ISO-)=V2$, then, $V(ISO+)-V(ISO-)=V3-V2$;

within the time $T10$:

$V(ISO+)=V3, V(ISO-)=V1$, then, $V(ISO+)-V(ISO-)=V3-V1$;

within the time $T11$:

$V(ISO+)=V1, V(ISO-)=V2$, then, $V(ISO+)-V(ISO-)=V1-V2$.

It can be seen that the rectangular waves in T2, T3, T6, T8, T11 and T12 may be used to record data information. At any moment when the data information has to be transmitted, regardless of the output voltage of the transmitter (for example, whether it is gradually changed or not), one of the transmitters has to directly pull the output voltage to the first voltage V1.

From T5 to T12, it only shows a part of the trapezoidal wave used to record the instant information; if a triangular wave is used, for example, at T10, V(ISO+) may be controlled to start to gradually change from the third voltage V3 to the second voltage V2.

It can also be seen that, in the target signal, the differential swing of the signal used to record the instant information is V3-V2. In other examples, the output voltage of the ISO-pin may not be maintained at the second voltage V2. For example, with combination of the fourth voltage V4 mentioned above, furthermore, during the process of changing the output voltage of the ISO+ pin from the second voltage to the third voltage V3, the output voltage of the ISO− pin may also change from the second voltage V2 to the fourth voltage V4 at the same time, then the differential swing of the signal used to record the instant information is /V3−V4/.

In a specific example, the first voltage V1 mentioned above may be, for example, 0V, the second voltage V2 may be, for example, 3V, the third voltage V3 may be, for example, 5V, and the fourth voltage V4 may be, for example, 1V.

It should also be pointed out that in some solutions, when the power supply of two communication nodes has to be electrically isolated, the communication line may not be directly connected and must be isolated. The isolation may be achieved through capacitance, electromagnetic or photoelectric isolation, etc.; then, the signal of a communication node may be transmitted to the other terminal that is electrically isolated through isolation devices such as capacitance, electromagnetic or optical coupling, and be received by another communication node. It can be regarded as an application scenario of serial isolated communication. In this scenario, if the solution of the present embodiment is not adopted, in order to meet the transmission needs of the data information and the instant information at the same time, in addition to introducing corresponding pins and communication lines, it is also necessary to introduce isolation devices and their corresponding circuit structures for the data information and the instant information, which will cause a sharp rise in costs. In comparison, when the present embodiment is applied to serial isolation communication, multiplexing of pins and isolation devices may be avoided, and the technical effect of cost saving may be achieved more significantly.

Figure 7:
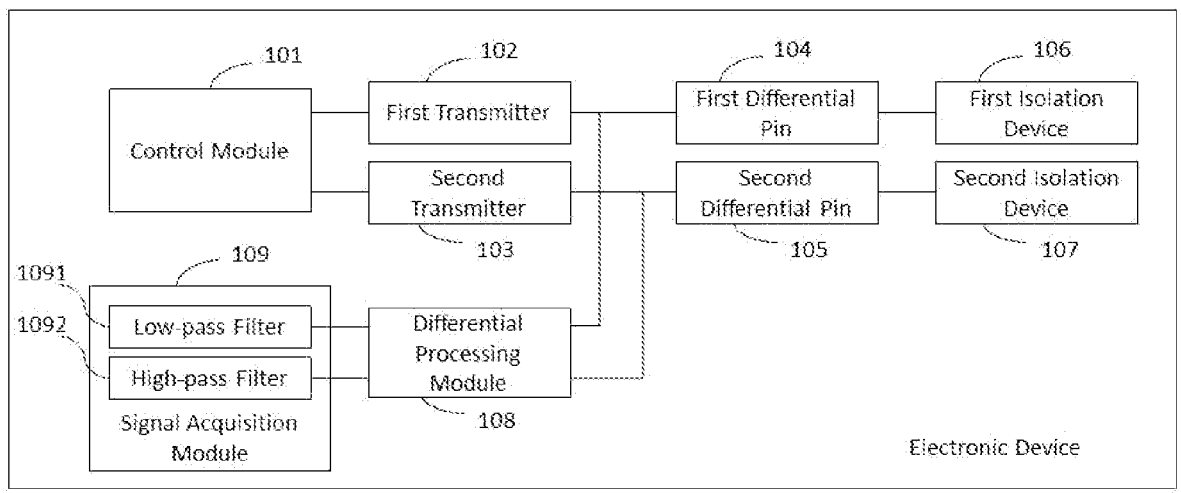
FIG. 7 is a structural schematic diagram 2 of an electronic device in an embodiment of the present invention.

FIG. 7 is a structural schematic diagram 2 of an electronic device in an embodiment of the present invention.

With reference to FIG. 7, the electronic device 1 as shown includes the signal transmitting circuit involved in the above optional solution.

In addition to the signal transmitting circuit, the electronic device 1 may also implement a signal receiving function.

Therefore, with reference to FIG. 7, the electronic device 1 also includes a signal receiving circuit for serial communication, the signal receiving circuit including a differential processing module 108 and a signal acquisition module 109, and further includes a first differential pin 104, a second differential pin 105 while including a first isolation device 106, a second isolation device 107 (i.e., the signal receiving circuit and the signal transmitting circuit may multiplex the same differential pin and isolation device).

The differential processing module 108 is connected to the first differential pin 104, the second differential pin 105, and the signal acquisition module 109 respectively.

The differential processing module 108 is configured to differentiate the first signal and the second signal from other electronic devices transmitted from the first communication line and the second communication line to obtain target signals of other electronic devices, and transmit the target signals of other electronic devices to the signal acquisition module;

The signal acquisition module 109 is configured to:

obtain a signal with the first frequency recording the data information of other electronic devices from the target signals of other electronic devices;

obtain a signal with the second frequency recording the instant information of other electronic devices from the target signals of other electronic devices.

The target signals, related data information, instant information, etc. of other electronic devices involved above may be understood with reference to the relevant descriptions above.

The differential processing module 108 may be understood as any circuit capable of differentiating between the two received signals.

In an embodiment, with reference to FIG. 7, the signal acquisition module 109 includes a low-pass filter 1091 and a high-pass filter 1092; both the low-pass filter 1091 and the high-pass filter 1092 are connected to the differential processing module 108.

If the first frequency is higher than the second frequency, the high-pass filter 1092 is configured to filter the target signals of other electronic devices to obtain the signal with the first frequency recording the data information of other electronic devices, and the low-pass filter 1091 is configured to filter the target signals of other electronic devices to obtain the signal with the second frequency recording the instant information of other electronic devices;

if the second frequency is higher than the first frequency, the low-pass filter 1091 is configured to filter the target signals of other electronic devices to obtain the signal with the first frequency recording the data information of other electronic devices, and the high-pass filter 1092 is configured to filter the target signals of other electronic devices to obtain the signal with the second frequency recording the instant information of other electronic devices.

The parameters of the filter may be arbitrarily selected and configured according to the requirements of the first frequency and the second frequency.

Further, the low-pass filter and high-pass filter may also transmit the acquired signal to the control module to facilitate further analysis and processing, or forward the signal to other circuit modules for processing or storage.

Figure 8:
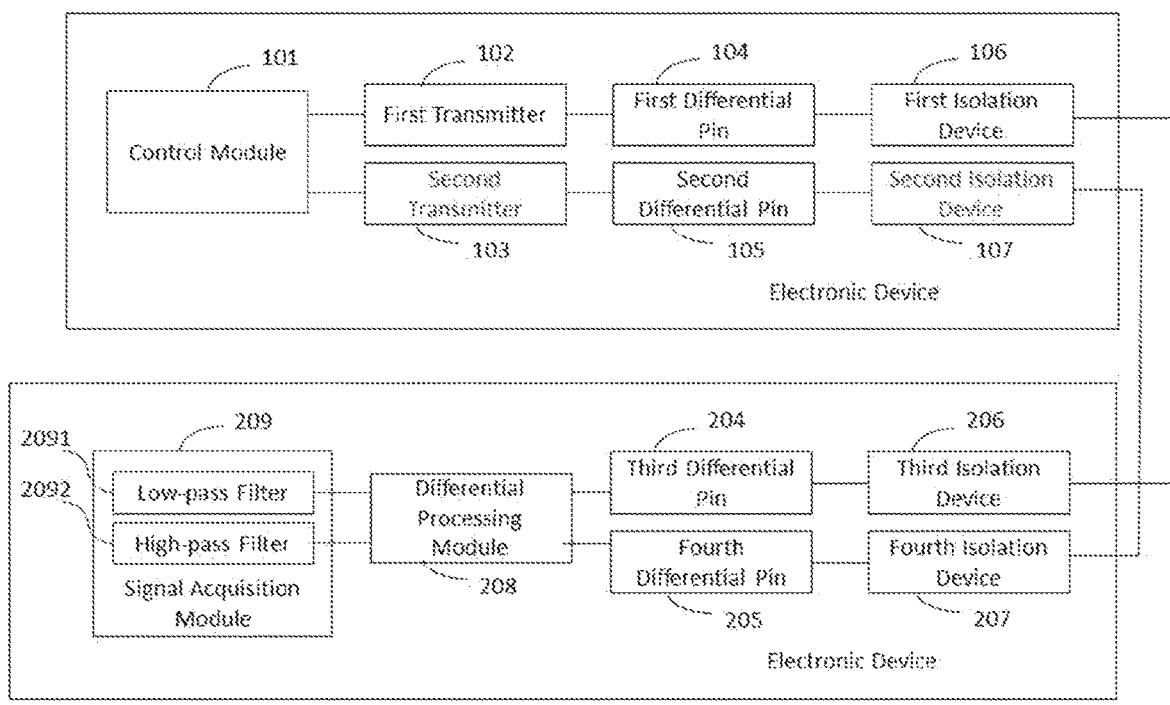
FIG. 8 is a schematic diagram 2 of a connection between electronic devices in an embodiment of the present invention.
Figure 9:
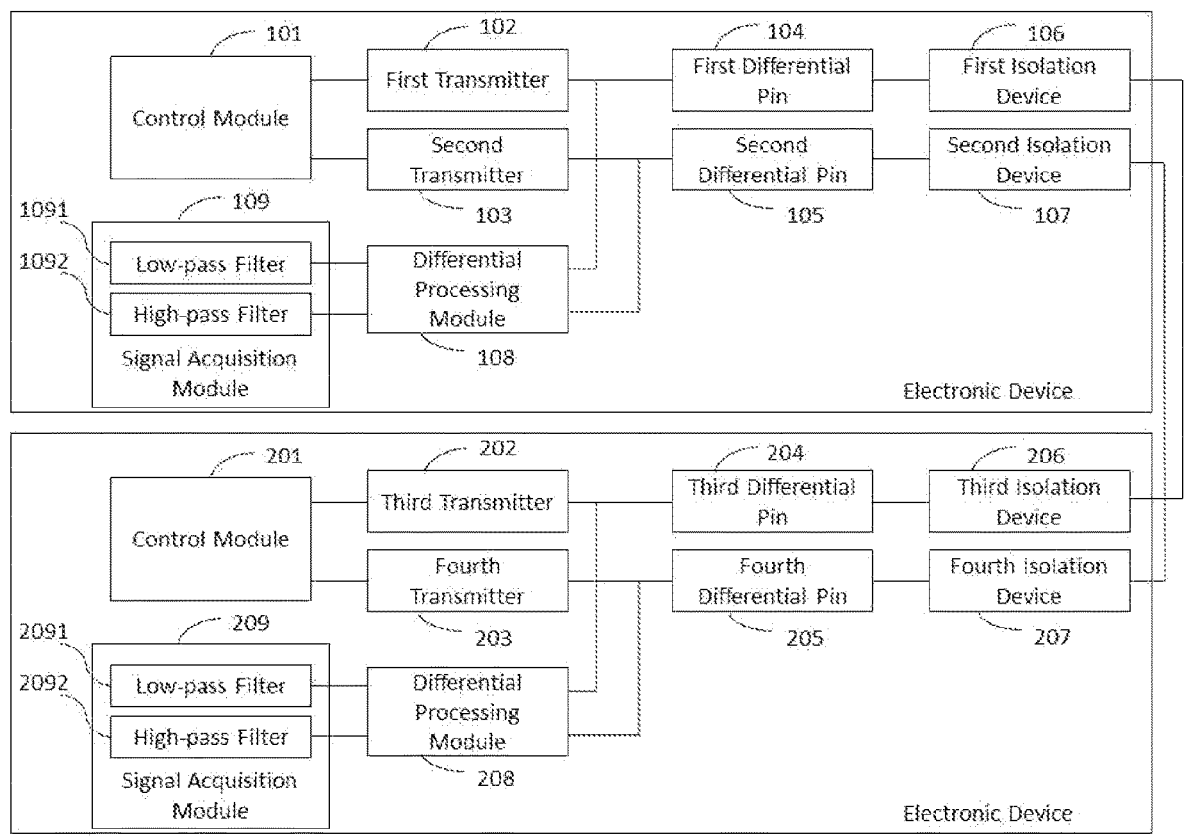
FIG. 9 is a schematic diagram 3 of a connection between electronic devices in an embodiment of the present invention.

FIG. 8 is a schematic diagram 2 showing connection between electronic devices in an embodiment of the present invention; FIG. 9 is a schematic diagram 3 showing a connection between electronic devices in an embodiment of the present invention.

FIGS. 8 and 9 illustrate the circuit structure of the electronic device 2 capable of communicating with the electronic device 1. Since it has to receive the signal transmitted by the electronic device 1, it may have a signal receiving circuit. Similar to the signal transmitting circuit mentioned above, the signal receiving circuit may be incorporated as a part of the electronic device shown in FIGS. 8 and 9, and the present embodiment does not exclude a solution in which the signal receiving circuit or part of the circuit is independent of the electronic device 2.

With reference to FIG. 8, the signal receiving circuit may include a third differential pin 204, a fourth differential pin 205, the differential processing module 208 and the signal acquisition module 209; the third differential pin 204 is configured to be externally connected to the first communication line, and the fourth differential pin 205 is configured to be externally connected to the second communication line. Specifically, if applied to the scenario of serial isolation communication, the signal receiving circuit further includes a third isolation device 206 and a fourth isolation device 207, wherein the third differential pin 204 is externally connected to the first communication line (and indirectly connected to the first differential pin 104 of the electronic device 1) through the third isolation device 206, and the fourth differential pin 205 is externally connected to the second communication line (and indirectly connected to the second differential pin 105 of the electronic device 1) through the fourth isolation device 207; the differential processing module 208 is respectively connected to the third differential pin 204, the fourth differential pin 205 and the signal acquisition module 209.

The differential processing module 208 is configured to:

differentiate the first signal and the second signal transmitted from the first communication line and the second communication line to obtain the target signals, and transmit the target signals to the signal acquisition module;

The signal acquisition module 209 is configured to:

obtain a signal with the first frequency recording the data information from the target signals;

obtain a signal with the second frequency recording the instant information from the target signals.

Optionally, the signal acquisition module 209 includes a low-pass filter 2091 and a high-pass filter 2092; both the low-pass filter 2091 and the high-pass filter 2092 are connected to the differential processing module 208;

if the first frequency is higher than the second frequency, the high-pass filter is configured to filter the target signals to obtain the signal with the first frequency recording the data information, and the low-pass filter is configured to filter the target signals to obtain the signal with the second frequency recording the instant information;

if the second frequency is higher than the first frequency, the low-pass filter is configured to filter the target signals to obtain the signal with the first frequency recording the data information, and the high-pass filter is configured to filter the target signals to obtain the signal with the second frequency recording the instant information.

In the electronic device 2, functions of the third differential pin 204, the fourth differential pin 205, the third isolation device 206, the fourth isolation device 207, the differential processing module 208 and the signal acquisition module 209 may be understood by referring to the first differential pin 104, the second differential pin 105, the first isolation device 106, the second isolation device 107, the differential processing module 108, and the signal acquisition module 109 in the electronic device 1 as mentioned above.

In an embodiment, the electronic device 2 may only be used for receiving and a signal is not required to transmit to the electronic device 1, so the device may not be equipped with a signal transmitting circuit.

In another embodiment, with reference to FIG. 9, the electronic device 2 may further be configured to transmit a signal to the electronic device 1, and further, the electronic device 2 may further include a signal transmitting circuit; the third differential pin 204 and the fourth differential pin 205 may be multiplexed with the signal receiving circuit of the electronic device 2, and the third isolation device 206 and the fourth isolation device 207 may further be multiplexed.

With reference to FIG. 9, in addition to the differential pins and isolation devices mentioned above, the signal receiving circuit of the electronic device 2 may also include a third transmitter 202, a fourth transmitter 203, and a control module 201. The connection relationship, circuit structure, and functions may all be understood with reference to the first transmitter 102, the second transmitter 103, and the control module 101 in the electronic device 1, which is a repetitive content and hence will not be repeated here.

In summary, in the signal transmitting circuit and the signal receiving circuit of serial isolation communication and the electronic device provided by the present embodiment, the same pair of differential pins are multiplexed to transmit data information and instant information, which may save pins and communication lines (if used in serial isolation communication, the isolation devices corresponding to the pins may further be saved) so as to be beneficial to save costs. At the same time, since the data information and the instant information in the present embodiment are transmitted at the same time, and may be distinguished based on frequency, there is no need to interrupt the transmission of data information in the present embodiment, so that higher transmission efficiency may be guaranteed, and interference and influence between signals of different information may be effectively avoided, thereby ensuring the accuracy of data transmission.

Those skilled in the art can understand that all or part of the steps in the foregoing method embodiments can be implemented by a program instructing relevant hardware. The aforementioned program can be stored in a computer readable storage medium. When the program is executed, it executes the steps including the foregoing method embodiments; and the foregoing storage medium includes: ROM, RANI, magnetic disk, or optical disk and other media that can store program codes.

At last, it should be noted that the above various embodiments are only used to describe the technical solutions of the present invention, rather than limiting the technical solutions of the present invention. Even through the present invention is described in detail with reference to the foregoing embodiments, those of ordinary skilled in the art should understand that they can still modify the technical solutions recorded in the foregoing various embodiments or equivalently replace some or all of the technical features. However, these modifications or replacements do not make the essence of the corresponding technical solutions deviate from the scope of the technical solutions of the embodiments of the present invention.

The invention claimed is:

1. A signal transmitting circuit for serial communication, comprising:

a control module, a first transmitter, a second transmitter, a first differential pin, and a second differential pin, wherein both the first transmitter and the second transmitter are controlled by the control module;

the first transmitter is connected to the first differential pin, and the first differential pin is configured to be externally connected to a first communication line;

the second transmitter is connected to the second differential pin, and the second differential pin is configured to be externally connected to a second communication line;

the control module is configured to:

control the first transmitter to output a first signal via the first differential pin, and control the second transmitter to output a second signal via the second differential pin to record target information with a target signal after differentiating between the first signal and the second signal, wherein the target information comprises data information and instant information, the data information is recorded in the target signal with a third signal with a first frequency while recording the instant information with a fourth signal with a second frequency, wherein the first frequency is different from the second frequency.

2. The signal transmitting circuit according to claim 1, wherein the control module is specifically configured to:
if the instant information to be transmitted is generated, control an output voltage of the first transmitter and/or the second transmitter to be subjected to a change between two different voltages to form the fourth signal recording the instant information in the target signal, the change comprises gradually changing or switching between the two different voltages;
at any time when the data information is to be transmitted, control the output voltage of the first transmitter or the second transmitter to be at a first voltage at a time to form the third signal recording the data information in the target signal.

3. The signal transmitting circuit according to claim 2, wherein the change further comprises maintaining a preset duration after gradually changing or switching to a higher voltage of the two different voltages.

4. The signal transmitting circuit according to claim 2, wherein the control module is specifically configured to implement, when controlling the output voltage of the first transmitter and/or the second transmitter to be subjected to the change between the two different voltages, at least one of:
controlling the output voltage of the first transmitter to change between a second voltage and a third voltage while controlling a voltage of the second transmitter to maintain at the second voltage;
controlling the output voltage of the first transmitter to change between the second voltage and the third voltage while controlling the output voltage of the second transmitter to change between the second voltage and a fourth voltage;
controlling the output voltage of the first transmitter to change between the second voltage and the fourth voltage while controlling the voltage of the second transmitter to maintain at the second voltage;
controlling the output voltage of the second transmitter to change between the second voltage and the third voltage while controlling the output voltage of the first transmitter to maintain at the second voltage;
controlling the output voltage of the second transmitter to change between the second voltage and the fourth voltage while controlling the output voltage of the first transmitter to maintain at the second voltage; and
controlling the output voltage of the second transmitter to change between the second voltage and the third voltage while controlling the output voltage of the first transmitter to change between the second voltage and the fourth voltage.

5. The signal transmitting circuit according to claim 4, wherein each of the first transmitter and the second transmitter comprises:
a first circuit, n second circuits and at least one circuit unit;
each of the at least one circuit unit comprises n third circuits, and the first circuit is connected in series with a first resistor and a first switch;
each of the n second circuits is provided with a second switch, and the n second circuits are connected in parallel with each other;
each of the n third circuits is provided with a third switch, and the n third circuits are connected in parallel with each other;
n is an integer greater than or equal to 1, and the first switch, the second switch, and the third switch are all controlled by the control module;
one terminal of the first circuit is connected to a first voltage source, one terminal after the n second circuits connected in parallel is connected to a second voltage source, and one terminal after the n third circuits of the at least one circuit unit are connected in parallel is connected to a third voltage source directly or indirectly;
the other terminal after the n second circuits are connected in parallel, the other terminal after the n third circuits are connected in parallel, and the other end of the first circuit are all connected to corresponding differential pins directly or indirectly;
when n second switches of any transmitter are closed, all of the third switches are open, and when the first switch is open, the output voltage of the any transmitter is a voltage of the second voltage source;
when the n third switches of any current circuit unit of any transmitter are closed, the n second switches are open, and when the first switch is open, the output voltage of the any transmitter is a voltage of the third voltage source connected to the any current circuit unit;
when the n second switches of any transmitter are open, all of the third switches are open, and when the first switch is closed, the output voltage of the any transmitter is a voltage of the first voltage source;
wherein the voltage of the first voltage source is lower than the voltage of the second voltage source and the voltage of the third voltage source, or the voltage of the first voltage source is higher than the voltage of the second voltage source and the voltage of the third voltage source.

6. The signal transmitting circuit according to claim 5, wherein the each of the n second circuits is further provided with a second resistor connected in series with the second switch, and the each of the n third circuits is provided with a third resistor connected in series with the third switch, or:
the each of the n third circuits in the at least one circuit unit is connected in parallel with one of the n second circuits and then connected to a common resistor, and is connected to a corresponding differential pin via a corresponding common resistor.

7. The signal transmitting circuit according to claim 6, wherein the control module, when controlling the output voltage of a corresponding transmitter to gradually change between the two different voltages, is specifically configured to
control the n second switches in the corresponding transmitter to open one by one when the n third switches of the corresponding transmitter are closed and the n second switches are open, and control one of the n third switches in the any current circuit unit opposite to the second switch to close while opening one of the n second switches; and
control the n third switches of the any current circuit unit in the corresponding transmitter to open one by one when the n second switches of the corresponding transmitter are closed and the n third switches are open, and control the one of the n second switches opposite to the third switch to close while opening the one of the n third switches.

8. The signal transmitting circuit according to claim 7, wherein if the each of the n second circuits is further provided with the second resistor connected in series with the second switch and the each of the n third circuits is provided with the third resistor connected in series with the third switch, for any pair of the second switch and the third switch opposite to each other, a resistance of the second resistor and a resistance of the third resistor connected in series therewith are identical.

9. The signal transmitting circuit according to claim 8, wherein if the gradually changing is gradually changing linearly, the resistance of the second resistor or the common resistor is identical, and an interval time when the control module controls the n second switches or the n third switches to open one by one is identical;
   if the gradually changing is gradually changing sinusoidally and the resistance of the second resistor or the common resistor is identical, the interval time when the control module controls the n second switches to open one by one or controls the n third switches to open one by one is different;
   if the gradually changing is gradually changing sinusoidally, the interval time when the control module controls the n second switches to open one by one or controls the n third switches to open one by one is identical, the resistance of the second resistor or the common resistor is different.

10. The signal transmitting circuit according to claim 5, wherein the voltage of the first voltage source in the first transmitter and the voltage of the first voltage source in the second transmitter are the first voltage, and the voltage of the second voltage source in the first transmitter and the voltage of the second voltage source in the second transmitter are the second voltage.

11. The signal transmitting circuit according to claim 5, wherein the third voltage source in the first transmitter comprises the third voltage source of the third voltage, and/or the third voltage source of the fourth voltage;
   the third voltage source in the second transmitter comprises the third voltage source of the third voltage, and/or the third voltage source of the fourth voltage.

12. The signal transmitting circuit according to claim 11, wherein if both the first transmitter and the second transmitter comprise the third voltage source of the third voltage and the third voltage source of the fourth voltage,
   the at least one circuit unit is a target circuit unit and n third circuit lines of the target circuit unit are alternatively connected to the third voltage source of the third voltage or the third voltage source of the fourth voltage under a control of the control module when a number of the at least one circuit unit is one;
   the n third circuits of one circuit unit of the at least one circuit unit are connected to the third voltage source of the third voltage and the n third circuits of other circuit units of the at least one circuit unit are connected to the third voltage source of the fourth voltage when the number of the at least one circuit unit is two.

13. The signal transmitting circuit according to claim 1, wherein a waveform of the fourth signal with the second frequency in the target signal is one selected from the group consisting of a triangular wave, a sine wave, and a trapezoidal wave;
   a waveform of the third signal with the first frequency in the target signal is a rectangular wave.

14. The signal transmitting circuit according to claim 1, wherein the first frequency is higher than the second frequency.

15. The signal transmitting circuit according to claim 1, wherein the instant information comprises at least one of:
   a reset command, an enable command, a start command, and alarm information; and
   wherein the alarm information comprises at least one of overvoltage information, undervoltage information, data error information, and clock error information.

16. An electronic device, comprising the signal transmitting circuit for the serial communication according to claim 1.

17. The electronic device according to claim 16, further comprising a signal receiving circuit for the serial communication, wherein the signal receiving circuit comprises a differential processing module and a signal acquisition module;
   the differential processing module is connected to the first differential pin, the second differential pin and the signal acquisition module respectively;
   the differential processing module is configured to:
   differentiate the first signal and the second signal from other electronic devices transmitted from the first communication line and the second communication line to obtain target signals of the other electronic devices, and transmit the target signals of the other electronic devices to the signal acquisition module;
   the signal acquisition module is configured to:
   obtain the third signal with the first frequency recording the data information of the other electronic devices from the target signals of the other electronic devices;
   obtain the fourth signal with the second frequency recording the instant information of the other electronic devices from the target signals of the other electronic devices.

18. The electronic device according to claim 17, wherein the signal acquisition module comprises a low-pass filter and a high-pass filter;
   both the low-pass filter and the high-pass filter are connected to the differential processing module;
   if the first frequency is higher than the second frequency, the high-pass filter is configured to filter the target signals of the other electronic devices to obtain the third signal with the first frequency recording the data information of the other electronic devices, and the low-pass filter is configured to filter the target signals of the other electronic devices to obtain the fourth signal with the second frequency recording the instant information of the other electronic devices; and
   if the second frequency is higher than the first frequency, the low-pass filter is configured to filter the target signals of the other electronic devices to obtain the third signal with the first frequency recording the data information of other electronic devices, and the high-pass filter is configured to filter the target signals of the other electronic devices to obtain the fourth signal with the second frequency recording the instant information of the other electronic devices.

19. A signal receiving circuit for serial communication, configured to receive the first signal and the second signal transmitted by the signal transmitting circuit for serial communication according to claim 1; wherein
   the signal receiving circuit comprises a third differential pin, a fourth differential pin, a differential processing module, and a signal acquisition module;
   the third differential pin is externally connected to the first communication line, and the fourth differential pin is externally connected to the second communication line;

the differential processing module is connected to the third differential pin, the fourth differential pin and the signal acquisition module respectively;

the differential processing module is configured to:

differentiate the first signal and the second signal transmitted from the first communication line and the second communication line to obtain target signals, and transmit the target signals to the signal acquisition module;

the signal acquisition module is configured to:

obtain the third signal with the first frequency recording the data information from the target signals;

obtain the fourth signal with the second frequency recording the instant information from the target signals.

20. The signal receiving circuit according to claim 19, wherein the signal acquisition module comprises a low-pass filter and a high-pass filter; both the low-pass filter and the high-pass filter are connected to the differential processing module;

if the first frequency is higher than the second frequency, the high-pass filter is configured to filter the target signals to obtain the third signal with the first frequency recording the data information, and the low-pass filter is configured to filter the target signals to obtain the fourth signal with the second frequency recording the instant information;

if the second frequency is higher than the first frequency, the low-pass filter is configured to filter the target signals to obtain the third signal with the first frequency recording the data information, and the high-pass filter is configured to filter the target signals to obtain the fourth signal with the second frequency recording the instant information.

* * * * *